(12) United States Patent
Wong et al.

(10) Patent No.: US 8,979,028 B2
(45) Date of Patent: Mar. 17, 2015

(54) ANTI-CROSS FLOW FUEL VENT SYSTEM ARCHITECTURE

(75) Inventors: Kenneth K. Wong, Irvine, CA (US); Stephen C. Metrulas, Irvine, CA (US); Rogerio Konig da Silva, Sao Paulo (BR); Michel Loignon, Laguna Beach, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/819,364

(22) PCT Filed: Oct. 12, 2011

(86) PCT No.: PCT/US2011/055901
§ 371 (c)(1),
(2), (4) Date: Feb. 27, 2013

(87) PCT Pub. No.: WO2012/051250
PCT Pub. Date: Apr. 19, 2012

(65) Prior Publication Data
US 2013/0161342 A1    Jun. 27, 2013

Related U.S. Application Data

(60) Provisional application No. 61/392,174, filed on Oct. 12, 2010.

(51) Int. Cl.
*B64C 17/10*    (2006.01)
*B64D 37/10*    (2006.01)
(Continued)

(52) U.S. Cl.
CPC .............. *B60K 15/035* (2013.01); *B64D 37/06* (2013.01); *B64D 37/32* (2013.01); *B60K 2015/03523* (2013.01); *B60Y 2200/51* (2013.01)
USPC .................................. 244/135 R; 244/135 C

(58) Field of Classification Search
USPC ............................... 244/135 R, 135 A, 135 C
See application file for complete search history.

(56) References Cited

U.S. PATENT DOCUMENTS

| 2,356,906 A | 8/1944 | Zitza |
| 2,404,418 A | 7/1946 | Walker |

(Continued)

OTHER PUBLICATIONS

International Preliminary Report on Patentabiltiy of corresponding International Application No. PCT/US2011/055901, dated Mar. 29, 2013.

(Continued)

*Primary Examiner* — Tien Dinh
*Assistant Examiner* — Michael Wang
(74) *Attorney, Agent, or Firm* — Renner, Otto, Boisselle & Sklar, LLP

(57) ABSTRACT

A venting system (10) in an aircraft (12), where the aircraft (12) is substantially symmetrical about a midline (14), has a pair of wings (16 and 18) extending outwardly on respective sides of the midline (14), a center fuel tank (20), a surge tank (22 and 24) at outer ends of each wing (16 and 18), and optionally one or more wing fuel tanks (26 and 28) interposed between the center fuel tank (20) and the respective surge tank (22 or 24). The venting system (10) for the center fuel tank (20) includes a main vent line (30) that extends across the midline (14) to vent openings (32 and 34) communicating with respective surge tanks (22 and 24). The main vent line (30) forms a linear flow path for fluid, generally air, flowing between opposite ends of the vent line (30). The venting system (10) also includes a branch vent line (36 and 38) extending from the main vent line (30) and opening on the center fuel tank (20). The branch line has at least one fuel tank opening (40 and 42) on each side of the midline (14).

11 Claims, 4 Drawing Sheets

(51) Int. Cl.
*B60K 15/035* (2006.01)
*B64D 37/06* (2006.01)
*B64D 37/32* (2006.01)

(56) References Cited

U.S. PATENT DOCUMENTS

| | | | |
|---|---|---|---|
| 2,404,765 A | 7/1946 | Valentyne | |
| 2,743,163 A | 4/1956 | Bunsen et al. | |
| 3,383,078 A | 5/1968 | Shohet et al. | |
| 3,419,233 A | 12/1968 | Wotton | |
| 3,476,140 A | 11/1969 | Jusyk | |
| 4,913,380 A | 4/1990 | Vardaman et al. | |
| 6,736,354 B2* | 5/2004 | Goto et al. | 244/135 C |
| 7,073,751 B1* | 7/2006 | Tighe et al. | 244/135 C |
| 7,334,464 B2 | 2/2008 | Goto | |
| 7,458,543 B2* | 12/2008 | Cutler et al. | 244/135 A |
| 7,621,483 B2* | 11/2009 | Cozens et al. | 244/135 R |
| 8,074,932 B2* | 12/2011 | Surawski | 244/135 R |
| 2007/0084511 A1* | 4/2007 | Johnson et al. | 137/265 |
| 2007/0234795 A1 | 10/2007 | Goto | |
| 2008/0149772 A1* | 6/2008 | Sandiford et al. | 244/135 R |
| 2008/0173762 A1* | 7/2008 | Crowley | 244/135 A |
| 2009/0090724 A1 | 4/2009 | Childress et al. | |
| 2010/0044515 A1* | 2/2010 | Neto | 244/135 C |
| 2011/0284694 A1* | 11/2011 | Yamaguchi et al. | 244/135 R |

OTHER PUBLICATIONS

International Search Report and Written Opinion of corresponding International Application No. PCT/US2011/055901, dated Mar. 5, 2013.

* cited by examiner

ANTI-CROSS FLOW FUEL VENT SYSTEM ARCHITECTURE

RELATED APPLICATIONS

This application claims the benefit of U.S. Provisional Application No. 61/392,174 filed Oct. 12, 2010, which is hereby incorporated herein by reference.

FIELD OF THE INVENTION

This invention relates to a fuel tank venting system for an aircraft, and more particularly, to the distribution architecture for an aircraft fuel tank venting system.

BACKGROUND OF THE INVENTION

An aircraft often has fuel tanks located in internal cavities in the aircraft's wings. The empty space in the fuel tanks that is not filled with fuel typically is a mixture of air and fuel vapor, and is referred to as ullage. To protect against fuel tank explosions, potentially combustible mixture of fuel vapor and air in the ullage space is replaced or diluted with an inert gas, such as nitrogen enriched air (NEA), to reduce the oxygen content in the ullage.

The fuel tanks generally are vented to the atmosphere to accommodate pressure changes with altitude during flight, thereby reducing the required strength, and thus weight, of the fuel tanks. While climbing, for example, the ambient pressure decreases as altitude increases. As a result, ullage gas in the fuel tank may be vented overboard to maintain pressure equilibrium or a specified pressure differential between the tank and the outside environment. The venting system typically vents the fuel tanks through a surge tank (an overflow tank that prevents unwanted ejection of fuel from the aircraft) located near a tip of the wing. The surge tank is provided with means for venting to atmosphere, and typically also includes means for draining fuel from the surge tank back to the fuel tanks.

Likewise, as an aircraft descends, the ambient pressure increases as the altitude decreases. Consequently, there may be a large inrush of ambient air into the ullage space during the descent. This is particularly true for an airplane with an open fuel tank vent, which is common on most commercial aircraft. Atmospheric air generally has about 21% oxygen content, so introduction of atmospheric air into the ullage space dilutes or spoils the inertness of the ullage. The inrush of atmospheric air can quickly raise the oxygen concentration in the ullage, which increases the combustion risk.

Additionally, frequently the pressure on the outlet of the venting system on one side of the aircraft will differ from the pressure on the other side of the aircraft. In a system with cross-venting, this may create a flow of gas that is large in magnitude through the venting system. If the center tank ullage is within this flow path, it must be assumed that this high magnitude of ambient air has polluted the air within the center tank and increased the oxygen concentration in the center tank ullage.

One way to address some of these problems is to provide a mixing chamber with a partition to prevent or minimize continuous flow from one side of the aircraft to the other and intermingling of air in the venting system through the ullage of the center fuel tank. U.S. Pat. No. 7,621,483 discloses such a mixing chamber.

SUMMARY OF THE INVENTION

In contrast to systems employing mixing chambers where the flow through the mixing chamber is other than linear, the present invention provides a fuel tank venting system for an aircraft that provides for linear flow through a main vent line and reduces the potential for atmospheric air to travel through a flow circuit that includes the ullage space in the center fuel tank.

More particularly, the present invention provides a venting system in an aircraft, where the aircraft is substantially symmetrical about a midline, has a pair of wings extending outwardly on respective sides of the midline, a center fuel tank, a surge tank at outer ends of each wing, and optionally one or more wing fuel tanks interposed between the center fuel tank and the respective surge tank. The venting system for the center fuel tank includes a main vent line that extends across the midline to vent openings communicating with respective surge tanks. The surge tanks typically are vented to atmosphere. The main vent line forms a linear flow path for fluid, generally air, flowing between opposite ends of the vent line. The venting system also includes a branch vent line extending from the main vent line and opening on the center fuel tank. The branch line has at least one fuel tank opening on each side of the midline.

Further features of the invention will become apparent from the following detailed description when considered in conjunction with the drawings.

DETAILED DESCRIPTION

The present invention provides an anti-cross flow fuel tank venting system for an aircraft that reduces the potential for atmospheric air to travel through a flow circuit that includes the ullage space in the center fuel tank. To minimize potential flammability and explosion risks, an inert gas, typically nitrogen-enriched air (NEA), is injected into the ullage space in the fuel tank through a distribution network. The venting system, which is separate from the NEA distribution network, is designed to relieve excess pressure differentials as the plane changes altitude or due to other events, such as during refueling.

The anti cross-venting architecture provided by the present invention also prevents or minimizes contamination of the ullage in the center tank in cross-venting conditions, where a pressure difference exists between the openings to atmosphere on opposite sides of the aircraft venting system. The system provided by the invention does so without adding any moving parts or the complexity of bifurcated inlets, or left/right vent isolation, yet still allows the implementation of a symmetric or near symmetric venting system while maintaining dual redundancy, specifically vent path redundancy. This is accomplished by limiting the pressure loss between the points at which the center tank vent lines branch off from the main vent line. The pressure loss at the points at which the center tank vent lines branch off the main vent line is much less than the pressure loss of any potential flow circuit through the center tank. In other words, the difference between (a) the pressure drop across the points where the branch vent lines branch off the main vent line, is much less than (b) the pressure drop across a circuit that includes the center fuel tank, from a first point where a branch line branches off the main vent line, through an outlet into the center fuel tank, through the ullage in the center fuel tank, and back to the main vent line. This difference in pressure drops causes most of the cross-flow air in the main vent line to remain in the main vent line, thereby minimizing the amount of air flow that would make use of the center tank flow path and consequently minimizing the dilution of the fuel tank ullage.

Figure 1:
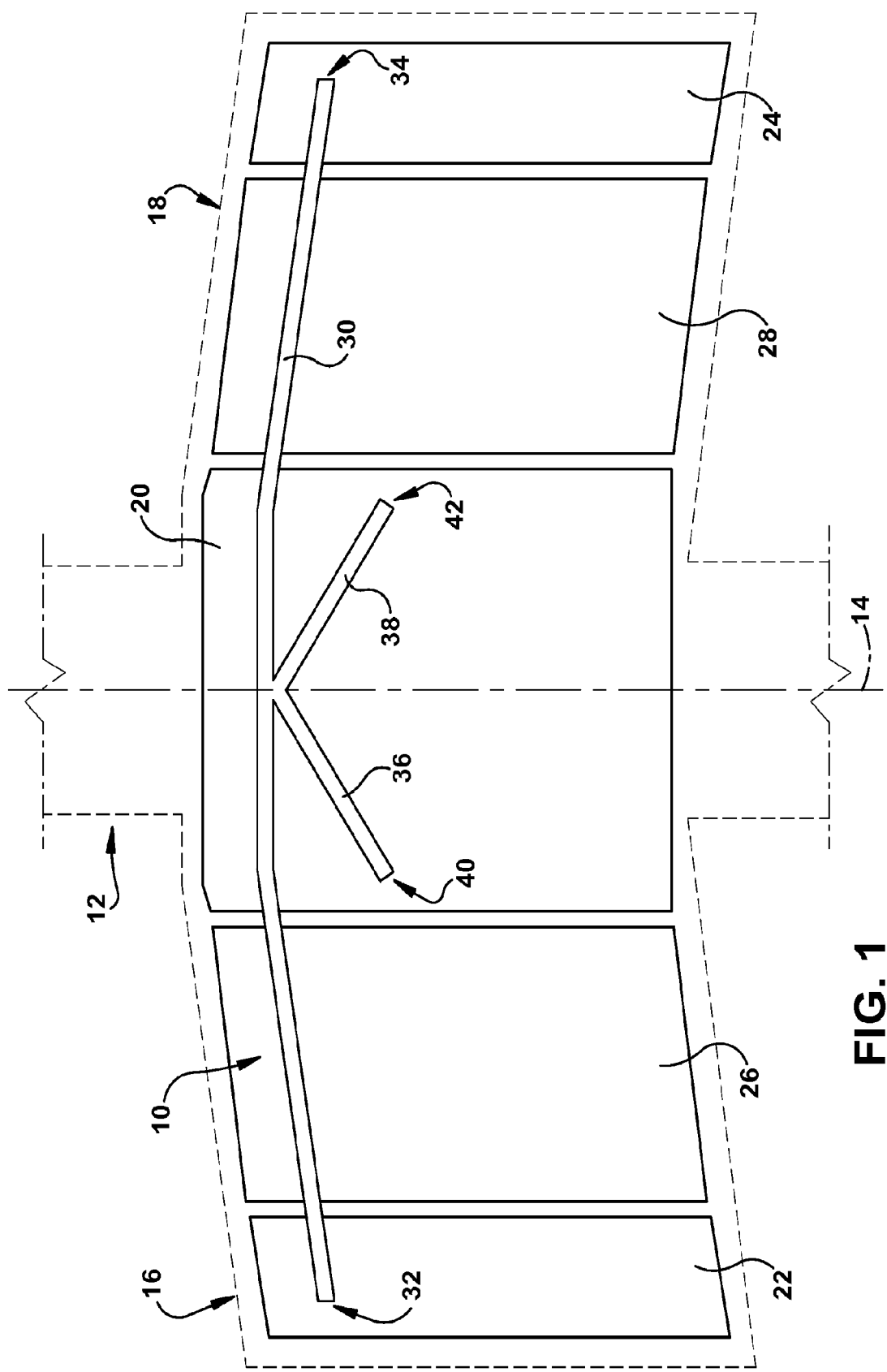
FIG. 1 is a schematic plan view of a first embodiment of an aircraft venting system according to the invention.

Referring now to the drawings in detail, and initially FIG. 1, the present invention provides an anti-cross flow fuel tank venting system 10 in an aircraft 12. The aircraft 12 is substantially symmetrical about a midline 14, has a pair of wings 16 and 18 extending outwardly on respective sides of the midline 14, a center fuel tank 20, a surge tank 22 and 24 at outer ends of each wing 16 and 18, respectively, and optionally one or more wing fuel tanks 26 and 28 interposed between the center fuel tank 20 and the respective surge tank 22 or 24. The surge tanks 22 and 24 typically are vented to atmosphere and includes means, such as a pump, for returning any fuel that enters the surge tank 22 or 24 back to a fuel tank 20 or 26 or 28. In a delta- or single-wing aircraft, the left wing and the right wing are not separated by a fuselage, but present a continuous lifting surface across the midline. For purposes of the invention, the lifting surfaces on either side of the midline will be considered separate wings.

The venting system 10 for the center fuel tank 20 includes a main vent line 30 that extends across the midline 14 to vent openings 32 and 34 communicating with respective surge tanks 22 and 24. The main vent line 30 provides redundant venting options, to the left and right surge tanks 22 and 24, while relieving pressure differentials between the left and right surge tanks 22 and 24, all without spoiling the ullage. These dual openings 32 and 34 from the main vent line 30 provide redundancy, so that if the main vent line 30 is blocked on one side of the midline 14, the center fuel tank 20 still has access to the opening 32 or 34 on the other side. The main vent line 30 preferably only vents the center fuel tank 20. The main vent line 30 forms a linear flow path for fluid flowing between the surge tank vent openings 32 and 34 on opposite ends of the main vent line 30.

The main vent line 30 generally has a substantially constant inside diameter over it length, and can be formed by pipe, conduit or other tubular construction.

The venting system 10 also includes one or more branch vent lines extending from the main vent line 30 into the center fuel tank 20. The branch vent line or lines include at least two fuel tank openings, at least one on each side of the midline 14. The branch vent lines typically are constructed in a similar manner as the main vent line 30, and typically have the same inside diameter. In FIG. 1, two vent lines 36 and 38 branch from a common point on the main vent line 30. In other words, the branch vent line includes first and second branch lines 36 and 38 that diverge in a V-shape, in a symmetrical or a mirror image about the midline 14, from the main vent line 30 toward the outlet fuel tank openings 40 and 42.

A venting system that is symmetrical or near-symmetrical within the center fuel tank 20, a mirror image about the midline 14, is preferred. A symmetrical vent system allows for a lower weight venting solution, and if the venting system is not symmetrical, the tuning of the NEA distribution system is more complex.

Figure 2:
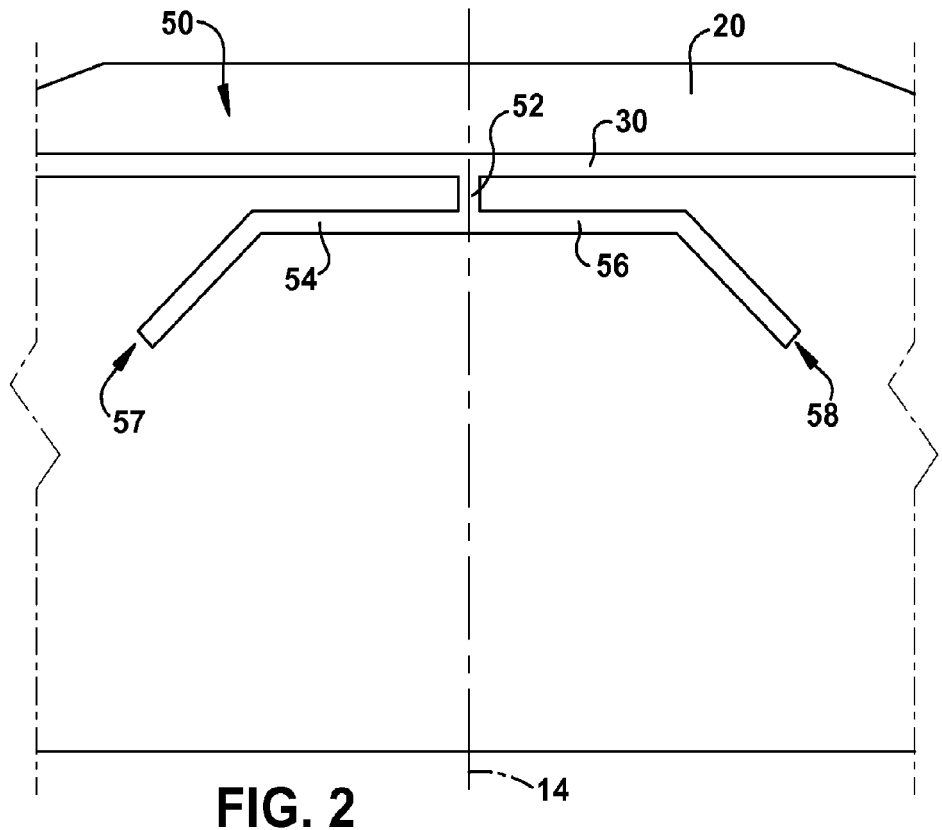
FIG. 2 is a schematic plan view of a portion of a second embodiment of an aircraft venting system according to the invention.

Variations on the system shown in FIG. 1 are contemplated within the scope of the present invention. Another symmetrical arrangement is shown in the venting system 50 of FIG. 2. Once again, a branch vent line 52 connects to the main vent line 30 at a single location. In this system 50, a first branch line 52 extends from a main vent line 30, and that first branch line 52 further divides into first and second branch lines 54 and 56 that lead to respective fuel tank openings 57 and 58 in the center fuel tank 20. Also note that the main vent line 30 defines a flow path that extends in a substantially straight line where the main vent line 30 passes through the center fuel tank 20.

Figure 3:
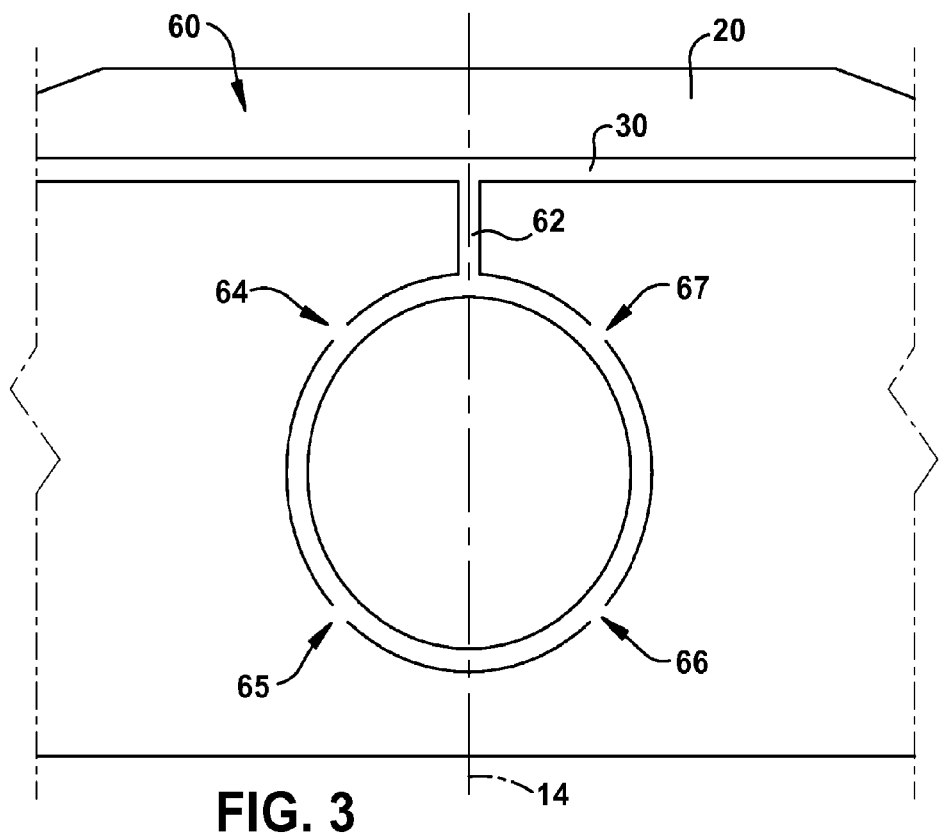
FIG. 3 is a schematic plan view of a portion of a third embodiment of an aircraft venting system according to the invention.

In the venting system 60 shown in FIG. 3, the branch vent line 62 again branches from the main vent line 30 at a single location, and then forms a continuous loop, with multiple, in this case four, fuel tank openings 64, 65, 66, and 67 spaced along the looped branch vent line 62, with two fuel tank openings on either side of the midline 14.

Figure 4:
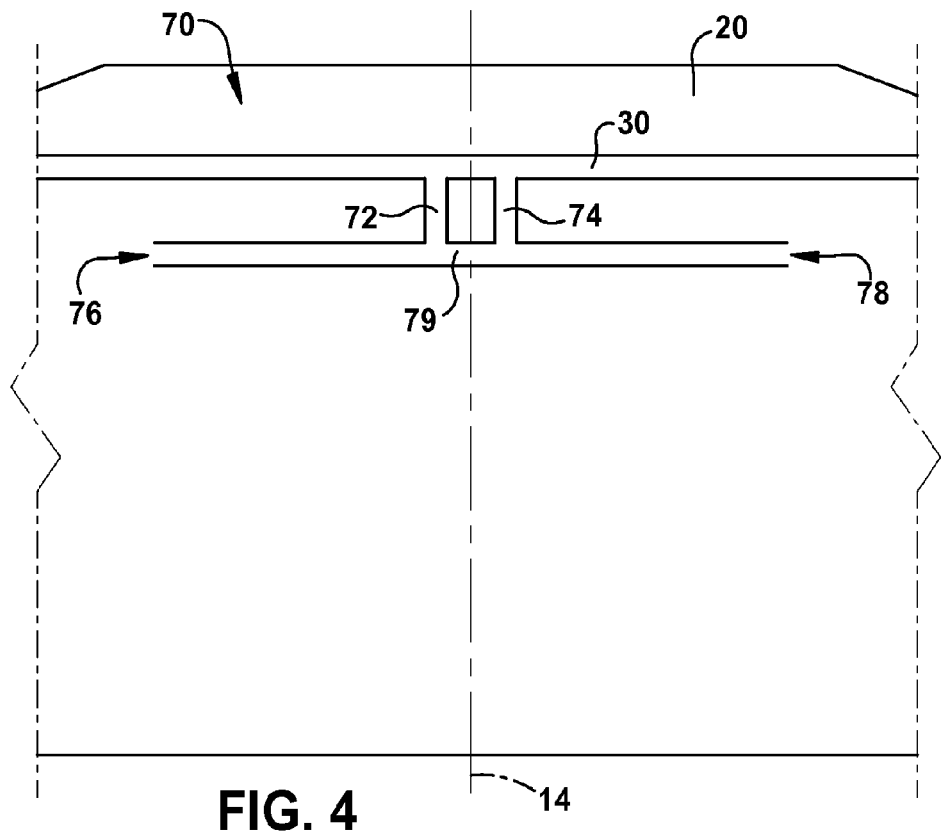
FIG. 4 is a schematic plan view of a portion of a fourth embodiment of an aircraft venting system according to the invention.

Another embodiment is shown in FIG. 4. In this embodiment, the venting system 70 has a branch line that includes both a first branch line 72 and a second branch line 74 on opposite sides of the midline 14. The first branch line 72 and the second branch line 74 are connected to the main vent line 30 at spaced apart locations, each branch line 72 and 74 extending to respective fuel tank openings 76 and 78 in the center fuel tank 20 from the main vent line 30. A distance between the locations where the first branch line 72 and the second branch line 74 connect to the main vent line 30 is less than a distance between locations where the first and second branch lines 72 and 74 connect to the main vent line 30 and a nearest outlet opening 76 and 78. The branch vent line further includes a third branch line 79 spaced from the main vent line 30 that connects the first and second branch lines 72 and 74, thereby providing another pathway to respective left and right fuel tank openings 76 and 78. To minimize cross-venting, the distance between the points where the first and second branch vent lines 72 and 74 branch from the main vent line should be minimized, thereby approximating a single vent line. In practice, to maintain redundancy in the event of a blockage of one branch line 72 or 74 or one side of the main vent line 30, that distance generally should be no more than approximately two to six times the diameter of the branch vent lines 72 and 74.

Figure 5:
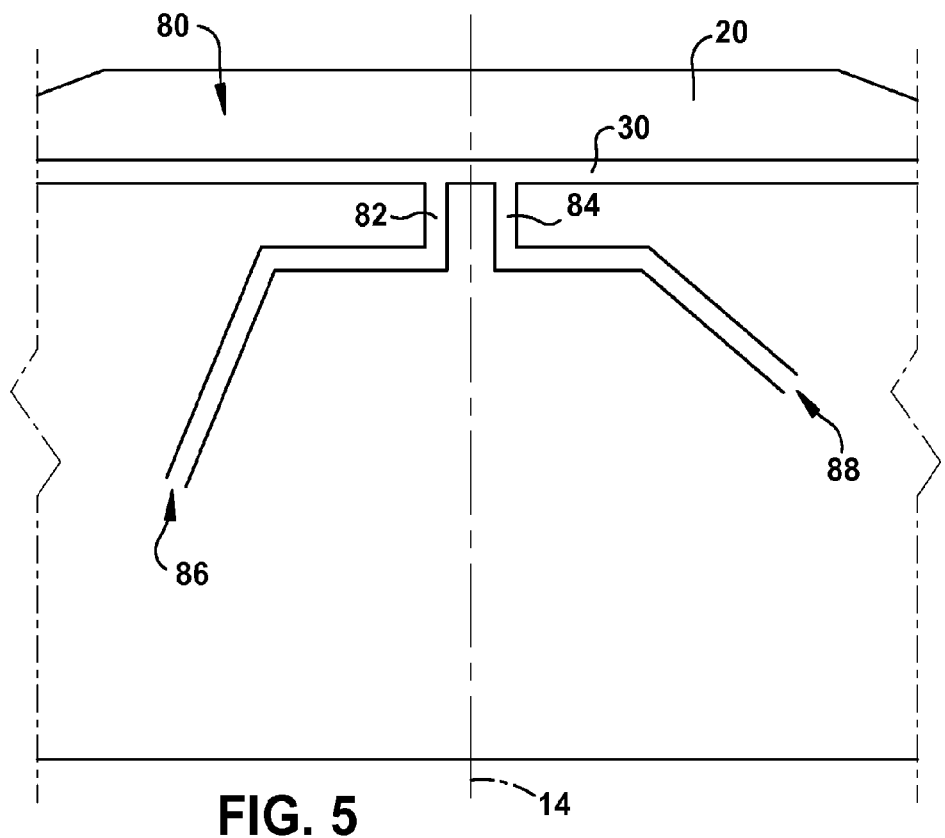
FIG. 5 is a schematic plan view of a portion of a fifth embodiment of an aircraft venting system according to the invention.

All of the embodiments shown to this point have been symmetrical about the midline of the aircraft, but that is not necessarily the case in every embodiment. An example is shown in FIG. 5. Here again, the venting system 80 has a branch line that includes both a first branch line 82 and a second branch line 84 on opposite sides of the midline 14. The first branch line 82 and the second branch line 84 are connected to the main vent line 30 at spaced apart locations, each branch line 82 and 84 extending to respective fuel tank openings 86 and 88 in the center fuel tank 20 from the main vent line 30. A distance between the locations where the first branch line 82 and the second branch line 84 connect to the main vent line 30 is less than a distance between locations where the first and second branch lines 82 and 84 connect to the main vent line 30 and a respective outlet opening 86 and 88. But in this case, the branch lines 82 and 84 are not symmetrical about the midline 14.

Figure 6:
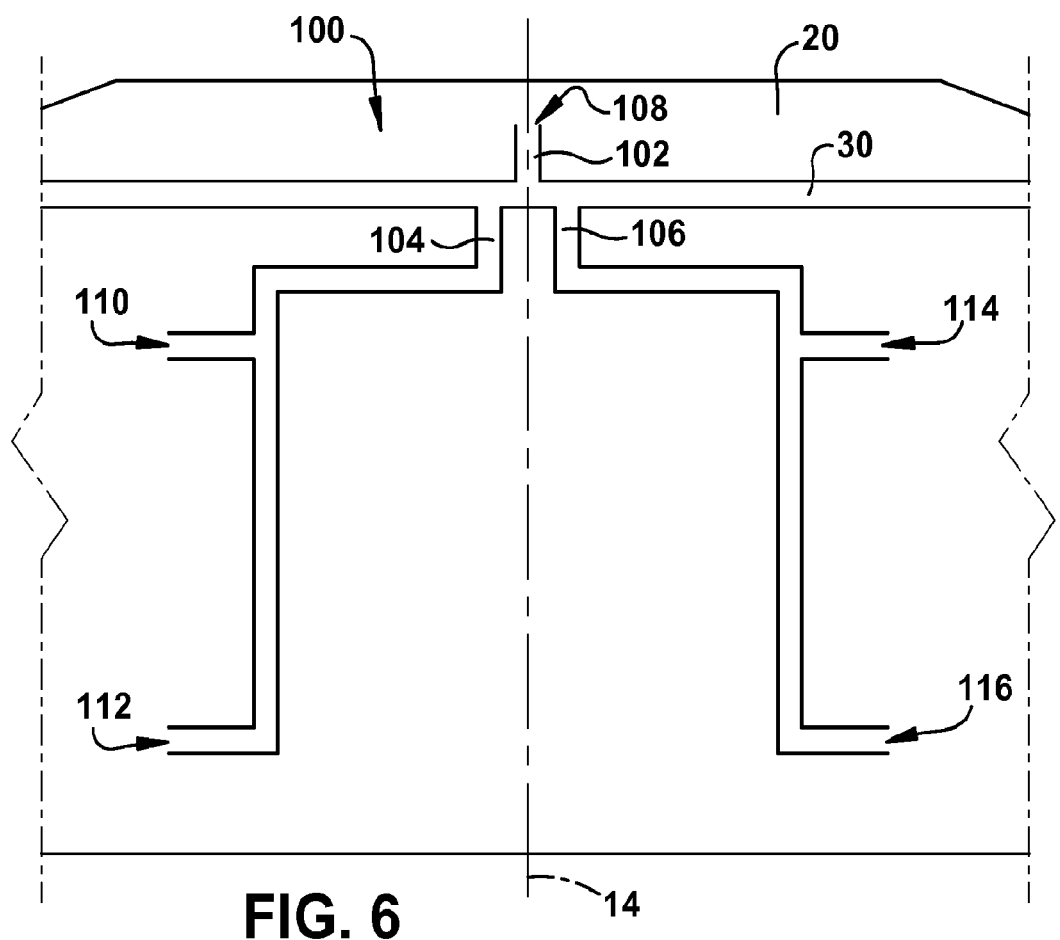
FIG. 6 is a schematic plan view of a portion of a sixth embodiment of an aircraft venting system according to the invention.

Finally, a more complex venting system 100 is shown in FIG. 6. In this embodiment, the system 100 has multiple branch lines, specifically three branch lines 102, 104, and 106, branching from the main vent line 30 at spaced locations, symmetrically relative to the midline 14. One branch line 102 has a single outlet opening 108 on the midline 14. The other two branch lines 104 and 106 have multiple outlet openings. Each of these branch lines 104 and 106 have two openings 110, 112, 114, and 116 spaced from each other. All of the vent openings 108, 110, 112, 114, and 116 are spaced about the center fuel tank 20.

In summary, the present invention provides a venting system 10 in an aircraft 12, where the aircraft 12 is substantially symmetrical about a midline 14, has a pair of wings 16 and 18 extending outwardly on respective sides of the midline 14, a center fuel tank 20, a surge tank 22 and 24 at outer ends of each wing 16 and 18, and optionally one or more wing fuel tanks 26 and 28 interposed between the center fuel tank 20 and the respective surge tank 22 or 24. The venting system 10 for the center fuel tank 20 includes a main vent line 30 that extends across the midline 14 to vent openings 32 and 34 communicating with respective surge tanks 22 and 24. The main vent line 30 forms a linear flow path for fluid, generally air, flowing between opposite ends of the vent line 30. The venting system 10 also includes a branch vent line 36 and 38 extending from the main vent line 30 and opening on the center fuel tank 20. The branch line has at least one fuel tank opening 40 and 42 on each side of the midline 14.

As should be clear from the foregoing description, the present invention provides one or more of the features set forth in the following clauses:

A. In an aircraft 12 that is substantially symmetrical about a midline 14, the aircraft 12 having a pair of wings 16 and 18 extending outwardly on respective sides of the midline 14, a center fuel tank 20, a surge tank 22 and 24 at outer ends of each wing 16 and 18, and optionally one or more wing fuel tanks 26 and 28 interposed between the center fuel tank 20 and the respective surge tank 22 and 24; a venting system 10 for the center fuel tank 20 comprises: a main vent line 30 that extends across the midline 14 to vent openings 32 and 34 communicating with respective surge tanks 22 and 24, the main vent line 30 forming a linear flow path for fluid flowing between opposite ends of the vent line 30; and a branch vent line 36 and 38 extending from the main vent line 30 into the center fuel tank 20, the branch line 36 and 38 having at least one fuel tank opening 40 and 42 on each side of the midline 14.

B. A venting system 10 as set forth in claim A or any other claim depending from claim A, where the main vent line 30 defines a flow path that extends in a substantially straight line where the main vent line 30 passes through the center fuel tank 20.

C. A venting system 10 as set forth in claim A or any other claim depending from claim A, where the branch vent line 36 and 38 connects to the main vent line 30 at a single location.

D. A venting system 10 as set forth in claim C or any other claim depending from claim C, where the branch vent line includes first and second branch lines 36 and 38 that diverge in a V-shape from the main vent line 30 toward the fuel tank openings 40 and 42.

E. A venting system 60 as set forth in claim A or any other claim depending from claim A, where the branch vent line 62 includes a continuous loop with the fuel tank openings 64, 65, 66, and 67 spaced apart along the loop.

F. A venting system 70 as set forth in claim A or any other claim depending from claim A, where the branch vent line includes both a first branch line 72 and a second branch line 74 connected to the main vent line 30 at spaced apart locations, each branch line 72 and 74 connecting one of the fuel tank openings 76 and 78 to the main vent line 30.

G. A venting system 70 as set forth in claim F or any other claim depending from claim F, where the first branch line 72 and the second branch line 74 are connected to the main vent line 30 at locations on opposite sides of the midline 14.

H. A venting system 70 as set forth in claim F or any other claim depending from claim F, where a distance between the locations where the first branch line 72 and the second branch line 74 connect to the main vent line 30 is less than a distance between locations where the first and second branch lines 72 and 74 connect to the main vent line 30 and a nearest outlet opening 76 or 78.

I. A venting system 70 as set forth in claim F or any other claim depending from claim F, where the branch vent line includes a third branch line 79 spaced from the main vent line 30 that connects the first and second branch lines 72 and 74.

J. A venting system 10 as set forth in claim A or any other claim depending from claim A, where the fuel tank openings 40 and 42 are symmetrically spaced about the midline 14.

K. A venting system 10 as set forth in claim A or any other claim depending from claim A, where the main vent line 30 has a substantially constant diameter over its length.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. In an aircraft that is substantially symmetrical about a midline, the aircraft having a pair of wings extending outwardly on respective sides of the midline, a center fuel tank, a surge tank vented to atmosphere at outer ends of each wing, and optionally one or more wing fuel tanks interposed between the center fuel tank and the respective surge tank; a venting system for the center fuel tank comprises:
   a main vent line that extends across the midline to vent openings communicating with respective surge tanks, the main vent line forming a linear flow path uninterrupted by any valves for gas flowing between the surge tanks at opposite ends of the vent line; and
   a branch vent line extending from the main vent line into the center fuel tank, the branch line having at least one fuel tank opening on each side of the midline, the openings being situated above the level of liquid fuel when the aircraft is in level flight.

2. A venting system as set forth in claim 1, where the main vent line defines a flow path that extends in a substantially straight line where the main vent line passes through the center fuel tank.

3. A venting system as set forth in claim 1, where the branch vent line connects to the main vent line at a single location.

4. A venting system as set forth in claim 3, where the branch vent line includes first and second branch lines that diverge in a V-shape from the main vent line toward the outlet openings.

5. A venting system as set forth in claim 1, where the branch vent line includes a continuous loop with the fuel tank openings spaced apart along the loop.

6. A venting system as set forth in claim 1, where the branch vent line includes both a first branch line and a second branch line connected to the main vent line at spaced apart locations, each branch line connecting one of the fuel tank openings to the main vent line.

7. A venting system as set forth in claim 6, where the first branch line and the second branch line are connected to the main vent line at locations on opposite sides of the midline.

8. A venting system as set forth in claim 6, where a distance between the locations where the first branch line and the second branch line connect to the main vent line is less than either the length of the first branch line or the length of the second branch line.

9. A venting system as set forth in claim 6, where the branch vent line includes a third branch line spaced from the main vent line that connects the first and second branch lines.

10. A venting system as set forth in claim 1, where the fuel tank openings are symmetrically spaced about the midline.

11. A venting system as set forth in claim 1, where the main vent line has a substantially constant diameter over its length.

* * * * *